(12) United States Patent
Kim et al.

(10) Patent No.: US 8,876,523 B2
(45) Date of Patent: Nov. 4, 2014

(54) INJECTION MOLDING APPARATUS

(75) Inventors: Jong Hwan Kim, Daejeon (KR); Hyo Sung Lim, Daejeon (KR); Myung Hoon Kim, Daejeon (KR)

(73) Assignee: SK Innovation Co., Ltd. (KR)

( * ) Notice: Subject to any disclaimer, the term of this patent is extended or adjusted under 35 U.S.C. 154(b) by 0 days.

(21) Appl. No.: 14/348,193

(22) PCT Filed: Jul. 30, 2012

(86) PCT No.: PCT/KR2012/006056
§ 371 (c)(1),
(2), (4) Date: Mar. 28, 2014

(87) PCT Pub. No.: WO2013/065931
PCT Pub. Date: May 10, 2013

(65) Prior Publication Data
US 2014/0242211 A1    Aug. 28, 2014

(30) Foreign Application Priority Data

Oct. 31, 2011    (KR) ................. 10-2011-0112098

(51) Int. Cl.
*B29C 45/40* (2006.01)
*B29C 45/26* (2006.01)
*B29C 45/17* (2006.01)

(52) U.S. Cl.
CPC ......... *B29C 45/2602* (2013.01); *B29C 45/4005* (2013.01); *B29C 45/401* (2013.01); *B29C 45/40* (2013.01); *B29C 45/1751* (2013.01); *B29C 45/2673* (2013.01); *B29C 2045/4094* (2013.01)
USPC .......................................... 425/556; 425/441

(58) Field of Classification Search
CPC .............. B29C 45/401; B29C 45/4005; B29C 45/1751; B29C 45/40; B29C 45/2602; B29C 45/2673; B29C 2045/4094
USPC ........................... 425/556, 441, 443, 436 RM
See application file for complete search history.

(56) References Cited

U.S. PATENT DOCUMENTS 2,511,350 A * 6/1950 Kosobud ................... 249/205
4,793,785 A * 12/1988 Osada ........................ 425/116

(Continued)

FOREIGN PATENT DOCUMENTS

| JP | 09039045 | 2/1997 |
|----|----------|--------|
| JP | 10180825 | 7/1998 |

(Continued)

OTHER PUBLICATIONS

International Search Report—PCT/KR2012/006056 dated Feb. 14, 2013.

*Primary Examiner* — Yogendra Gupta
*Assistant Examiner* — Emmanuel S Luk
(74) *Attorney, Agent, or Firm* — Cantor Colburn LLP

(57) ABSTRACT

Provided is an injection molding apparatus including: an upper mold; a lower mold; a receive block; a fixed block; a movable block; a variable cavity; a movable block adjusting unit; and an ejector pipe.

7 Claims, 11 Drawing Sheets

(56) References Cited

U.S. PATENT DOCUMENTS

| | | | | |
|---|---|---|---|---|
| 4,867,668 | A * | 9/1989 | Miyairi | 425/192 R |
| 5,141,430 | A * | 8/1992 | Maus et al. | 425/556 |
| 5,359,764 | A * | 11/1994 | Sasaki et al. | 29/426.6 |
| 5,429,492 | A * | 7/1995 | Taniyama | 425/556 |
| 5,834,035 | A * | 11/1998 | Osada et al. | 425/116 |
| 8,070,479 | B2 * | 12/2011 | Chang et al. | 425/569 |
| 2006/0013908 | A1 * | 1/2006 | Ogata et al. | 425/129.1 |
| 2010/0278953 | A1 * | 11/2010 | Ni et al. | 425/150 |
| 2011/0045119 | A1 * | 2/2011 | Huang | 425/443 |
| 2011/0193266 | A1 | 8/2011 | Fukuta | |
| 2012/0107441 | A1 * | 5/2012 | Li et al. | 425/443 |

FOREIGN PATENT DOCUMENTS

| | | |
|---|---|---|
| JP | 2594420 | 2/1999 |
| JP | 11034119 | 2/1999 |
| JP | 2002011757 | 1/2002 |
| JP | 2003251658 | 9/2003 |

\* cited by examiner

INJECTION MOLDING APPARATUS

TECHNICAL FIELD

The present invention relates to an injection molding apparatus, and more particularly, to an injection molding apparatus for manufacturing an injection molding product.

BACKGROUND ART

An injection molding apparatus generally indicates an apparatus of manufacturing various plastic products (injection molding products) by injecting a thermoplastic resin which is a main raw material into an injection cylinder, melting the thermoplastic resin, pushing the melted resin into a cavity of a metal mold by a screw of a hydraulic plunger or an extruder, and then cooling and hardening the resin. The metal mold used in the injection molding as described above is called an injection mold.

In an injection molding apparatus disclosed in US Patent Laid-Open Publication No. 2001-0193266, a mold and a cavity which is a space into which a melted resin is inserted to manufacture an injection molding product are formed integrally with each other in the mold.

Therefore, in the injection molding apparatus according to the related art, the mold and the cavity are formed integrally with each other, such that a size of the cavity may not be adjusted.

Further, in the injection molding apparatus according to the related art, the mold and the cavity are manufactured integrally with each other so as to be matched to a thickness of a product inserted into the cavity, such that it is required to manufacture a plurality of molds so as to be matched to a thickness of an inserted injection molding product.

Further, in the injection molding apparatus according to the related art, when the thickness of the injection molding product is changed, the mold is replaced and again installed, such that manpower is wasted and production of an injection molding product is delayed.

RELATED ART DOCUMENT

Patent Document

US 2011-0193266 A1 (Aug. 11, 2011)

DISCLOSURE OF INVENTION

Technical Problem

An object of the present invention is to provide an injection molding apparatus capable of minimizing the manufacturing of a mold, preventing manpower from being wasted, preventing production of an injection molding product from being delayed, and adjusting a size of a cavity according to a size of an injection molding product inserted into the cavity.

Solution to Problem

In one general aspect, an injection molding apparatus includes: an upper mold including a first plate, a first pair of plates arranged in a horizontal direction and each having an upper ends coupled to a lower surface of the first plate, and a cylinder penetrating through the first plate in a vertical direction so that a lower portion thereof protrudes downwardly of the first plate and ascending and descending; a lower mold including a second plate spaced downwardly apart from the first plate by a predetermined distance, a second pair of plates arranged in the horizontal direction and each having a lower end coupled to an upper surface of the second plate and an upper end contacting a lower end of the first pair of plates, and an injection hole formed at a central portion of the second plate and having a melted resin injected therethrough; a receive block disposed in parallel with the first plate and having a lower portion of the cylinder buried therein; a fixed block interposed between the first pair of plates; a movable block spaced downwardly apart from the fixed block by a predetermined interval, interposed between the first pair of plates or between the second pair of plates, and ascending and descending; a variable cavity formed between the movable block and the upper and lower molds, filled with the melt resin injected from the injection hole, and having a size adjusted by the ascent and the descent of the movable block; a movable block adjusting unit connecting the fixed block and the movable block to each other and adjusting the ascent and the descent of the movable block; and an ejector pipe having an upper portion buried in the receive block, penetrating through the fixed block and the movable block in the vertical direction, and ascending or descends by the cylinder and the receive block to eject the melted resin solidified in the variable cavity to the outside.

The injection molding apparatus may further include an internal mold received in the variable cavity.

The internal mold may be formed in a rectangular shape.

The movable block adjusting unit may be a first spring connecting the fixed block and the movable block to each other.

The first spring may have an upper portion buried in the fixed block and a lower portion buried in the movable block.

In another general aspect, an injection molding apparatus has the same configuration as that of the injection molding according to one general aspect of the present invention except for a movable block adjusting unit.

The movable block adjusting unit may include: a screw screwed to the fixed block so that a lower portion thereof protrudes downwardly from the fixed block; A screw handle coupled to an upper end of the screw; a second spring wound around a lower circumference of the screw; a shaft part formed in a sandglass shape and having an upper end coupled to a lower end of the screw; and a suspending box having a lower portion of the shaft part rotatably inserted thereinto, and insertedly coupled into the movable block.

The suspending box may have a structure in which widths of a left surface and a right surface thereof in the horizontal direction become gradually narrower toward a downward direction.

Advantageous Effects of Invention

Therefore, the injection molding apparatus according to the present invention prevents a problem that a plurality of molds are manufactured so as to be matched to a thickness of an injection molding product, thereby making it possible to save a manufacturing cost of the mold.

In addition, the injection molding apparatus according to the present invention may efficiently cope with a change in a thickness of the injection molding product.

BRIEF DESCRIPTION OF DRAWINGS

The above and other objects, features and advantages of the present invention will become apparent from the following description of preferred embodiments given in conjunction with the accompanying drawings, in which.

DETAILED DESCRIPTION OF MAIN ELEMENTS

1000: Injection Molding Apparatus According to Exemplary Embodiment of Present Invention
100: Upper Mold 101: First plate
102: First Pair of Plates 110: Cylinder
200: Lower Mold 201: Second Plate
202: Second Pair of Plates 203: Injection Hole
300: Receive Block 400: Fixed Block
500: Movable Block 550: Variable Cavity
600: Movable Block Adjusting Unit
610: First Spring 620: Screw
621: Screw Handle 630: Second Spring
640: Shaft Part 650: Suspending Box
800: Ejector Pipe 900: Internal Mold

BEST MODE FOR CARRYING OUT THE INVENTION

Hereinafter, a technical spirit of the present invention will be described in more detail with reference to the accompanying drawings.

In a direction, a horizontal direction in the accompanying drawings will be defined as a horizontal direction and a vertical direction in the accompanying drawings will be defined as a vertical direction.

Figure 1:
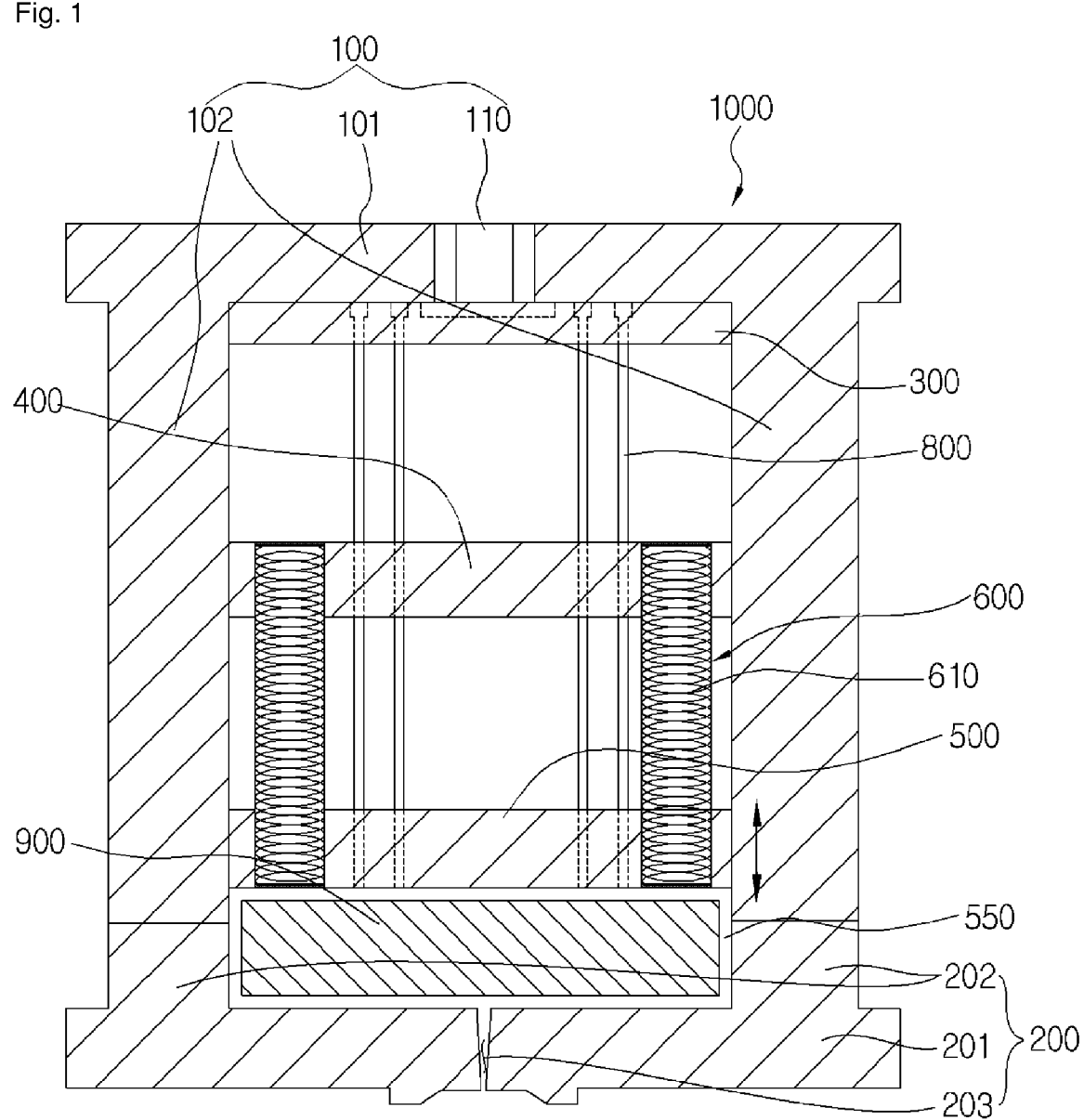
FIG. 1 is a cross-sectional view of an injection molding apparatus according to an exemplary embodiment of the present invention.

FIG. 1 is a cross-sectional view of an injection molding apparatus according to an exemplary embodiment of the present invention.

As shown in FIG. 1, the injection molding apparatus 1000 according to the exemplary embodiment of the present invention is configured to include an upper mold 100, a lower mold 200, a receive block 300, a fixed block 400, a movable block 500, a variable cavity 550, a movable block adjusting unit 600, and a plurality of ejector pipes 800.

The upper mold 100 is configured to include a first plate 101, a first pair of plates 102 arranged in a horizontal direction and each having an upper ends coupled to a lower surface of the first plate 101, and a cylinder 110 penetrating through the first plate 101 in a vertical direction so that a lower portion thereof protrudes downwardly of the first plate 101 and connected to an external apparatus to ascend and descend.

The lower mold 200 is configured to include a second plate 201 facing the first plate 101 and spaced downwardly apart from the first plate 101 by a predetermined distance, a second pair of plates 202 arranged at the same interval as an interval at which the first pair of plates 102 is arranged and each having a lower end coupled to an upper surface of the second plate 201 and an upper end contacting a lower end of the first pair of plates 102, and an injection hole 203 formed by perforating a central portion of the second plate and having a melted resin injected therethrough.

The receive block 300 is formed in a plate shape, contacts the lower surface of the first plate 101, and has a lower portion of the cylinder 110 buried therein, wherein the cylinder 100 protrudes downwardly of the first plate 101.

That is, the lower portion of the cylinder 110 protruding downwardly of the first plate 101 is insertedly coupled into the receive block 300.

The fixed block 400 is interposed between the first pair of plates 102 and has left and right ends each fixed to the first pair of plates 102.

Here, it is preferable that the left and right ends of the fixed block 400 are welded to the first pair of plates 102, respectively.

The movable block 500 is spaced downwardly apart from the fixed block 400 by a predetermined interval, is interposed between the first pair of plates or between the second pair of plates to thereby be closely adhered thereto, and freely ascends and descends.

The variable cavity 550, which is a space formed between the movable block 500 and the upper and lower molds 100 and 200, is filled with the melt resin injected from the injection hole 203, and has a size adjusted by the ascent and the descent of the movable block 500.

That is, the size of the variable cavity 550 becomes larger as the movable block 500 ascends and becomes smaller as the movable block 500 descends.

The ejector pipe 800 has an upper portion buried in the receive block 300, penetrates through the fixed block 400 and the movable block 500 in the vertical direction, and ascends or descends by the cylinder 110 and the receive block 300 to eject the melted resin solidified in the variable cavity 550 to the outside.

More specifically, in the case in which the ejector pipe 800 descends, a lower portion of the ejector pipe 800 protrudes toward the variable cavity 550 to eject the melted resin solidified in the variable cavity 550 to the outside.

In addition, it is preferable that the ejector pipes 800 are replaced with pipes having various lengths according to the size of the variable cavity 550.

Therefore, the injection molding apparatus 1000 according to the exemplary embodiment of the present invention includes the variable cavity 550, thereby making it possible to prevent a problem that a plurality of molds are manufactured so as to be matched to a thickness of an injection molding product and save a manufacturing cost of the mold.

In addition, the injection molding apparatus 1000 according to the exemplary embodiment of the present invention includes the variable cavity 550, thereby making it possible to efficiently cope with a change in a thickness of an injection molding product.

Further, the injection molding apparatus 1000 according to the exemplary embodiment of the present invention may further include an internal mold 900 received in the variable cavity 550 to determine a shape of the injection molding product.

The internal mold 900 is formed in a rectangular shape. However, the internal mold 900 may be formed in various shapes.

Although the injection molding apparatus 1000 according to the exemplary embodiment of the present invention may provide an injection molding product having a shape of a case of a battery pack or a rectangular shape, the injection molding apparatus 1000 according to the exemplary embodiment of the present invention is not limited to providing the injection molding product having the above-mentioned shape, but may also provide products having various shapes.

In addition, the internal mold 900 is simply replaced according to the size of the injection molding product, thereby making it possible to efficiently cope with a change in a thickness of the injection molding product.

Figure 2:
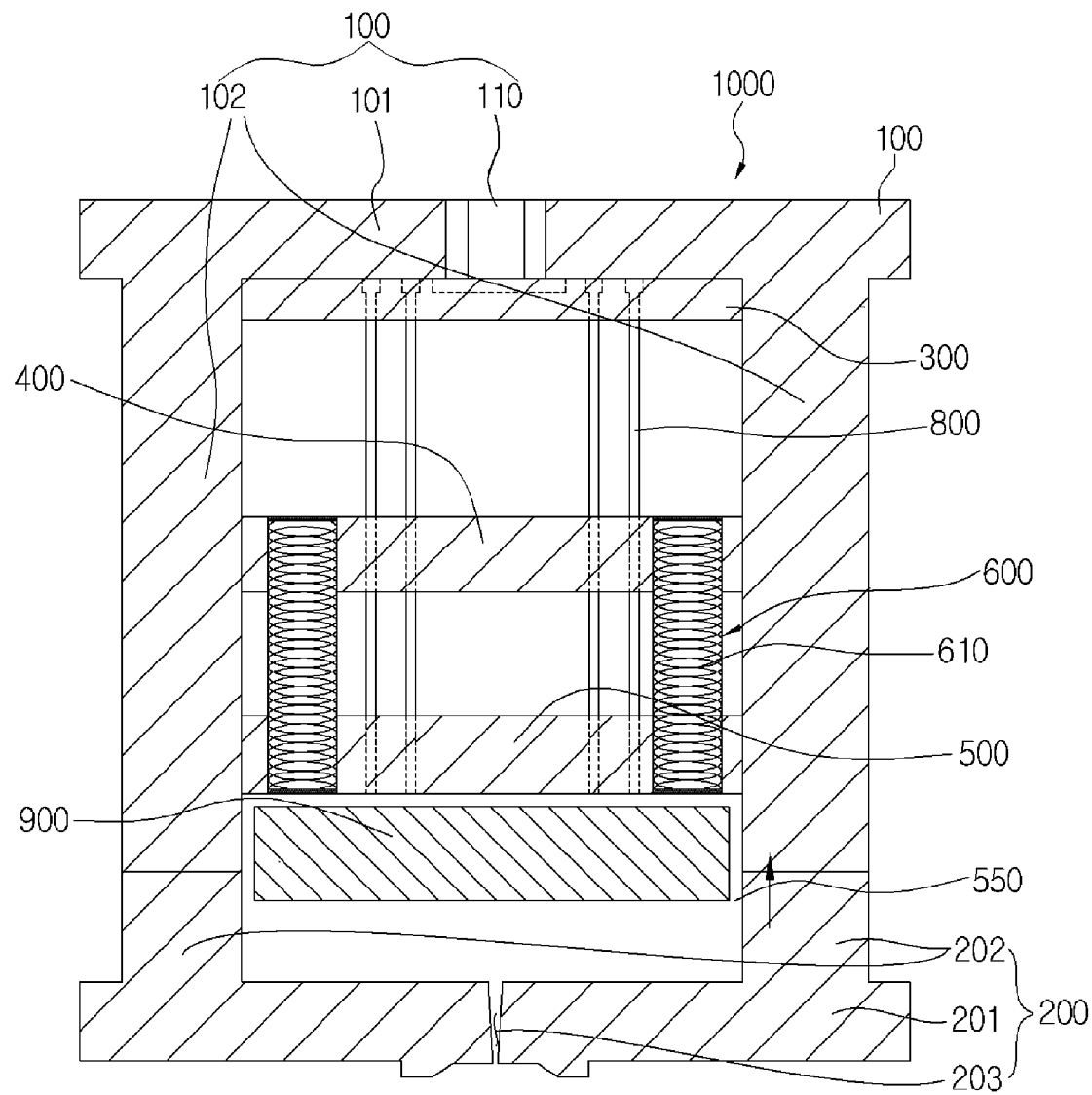
FIG. 2 is a cross-sectional view showing a state in which a movable block of the injection molding apparatus according to the exemplary embodiment of the present invention ascends.

FIG. 2 is a cross-sectional view showing a state in which a movable block of the injection molding apparatus according to the exemplary embodiment of the present invention ascends.

As shown in FIG. 2, in the injection molding apparatus 1000 according to the exemplary embodiment of the present invention, the movable block adjusting unit 600 is a first spring 610.

The first spring 610 has an upper portion buried in the fixed block 400 and a lower portion buried in the movable block 500 and is contracted and expanded to allow the movable block 500 to ascend and descend.

Here, the contraction and the expansion of the first spring 610 are performed in a manual scheme.

Figure 3:
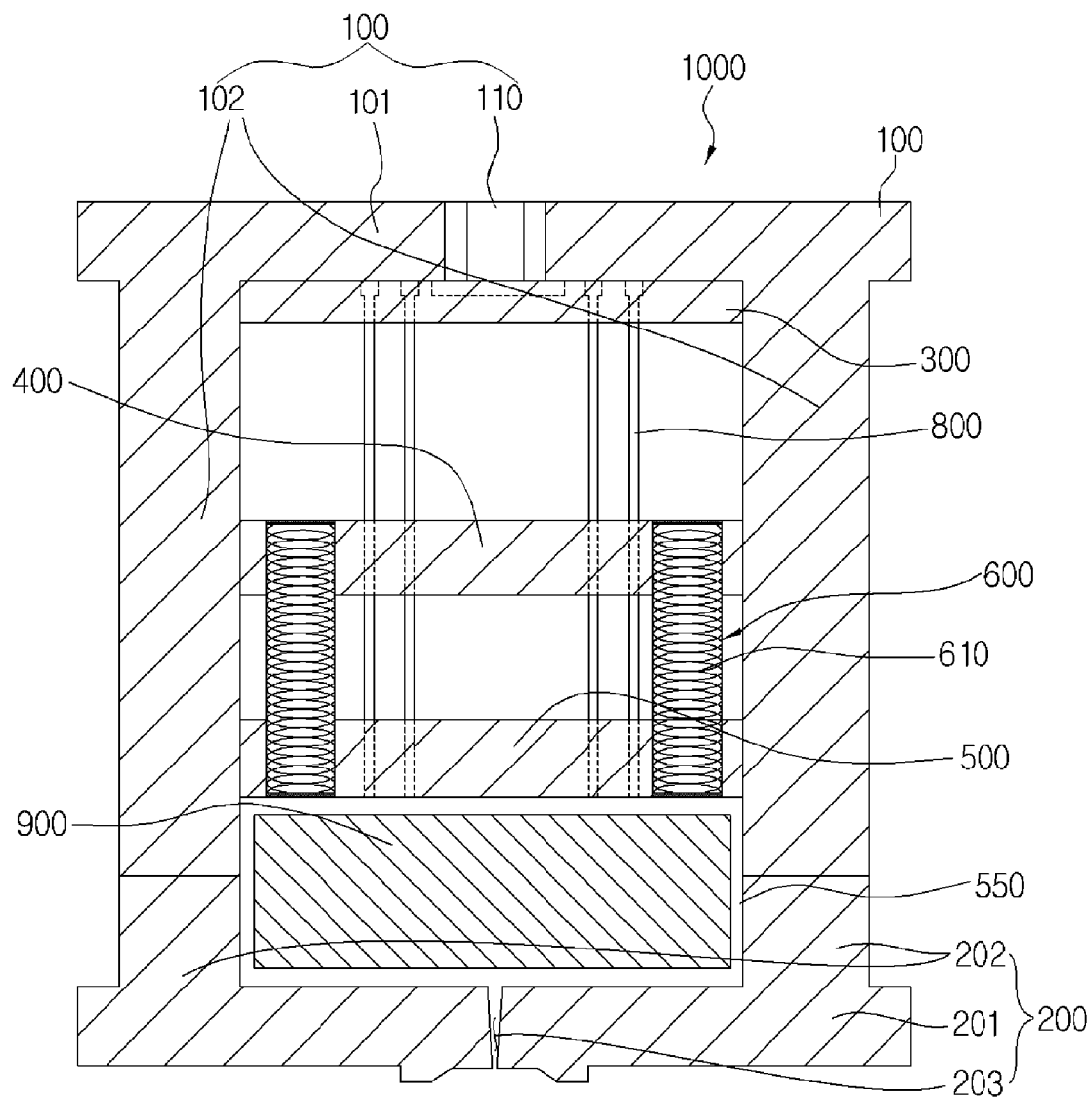
FIG. 3 is a cross-sectional view showing a state in which an internal mold of the injection molding apparatus according to the exemplary embodiment of the present invention is replaced.

FIG. 3 is a cross-sectional view showing a state in which an internal mold of the injection molding apparatus according to the exemplary embodiment of the present invention is replaced.

As shown in FIG. 3, in the injection molding apparatus 1000 according to the exemplary embodiment of the present invention, the internal mold 900 received in the variable cavity 550 may be simply replaced.

Therefore, since the internal mold 900 received in the variable cavity 550 may be simply replaced, the injection molding apparatus 1000 according to the exemplary embodiment of the present invention may freely adjust a size of an internal space of the injection molding product.

Figure 4:
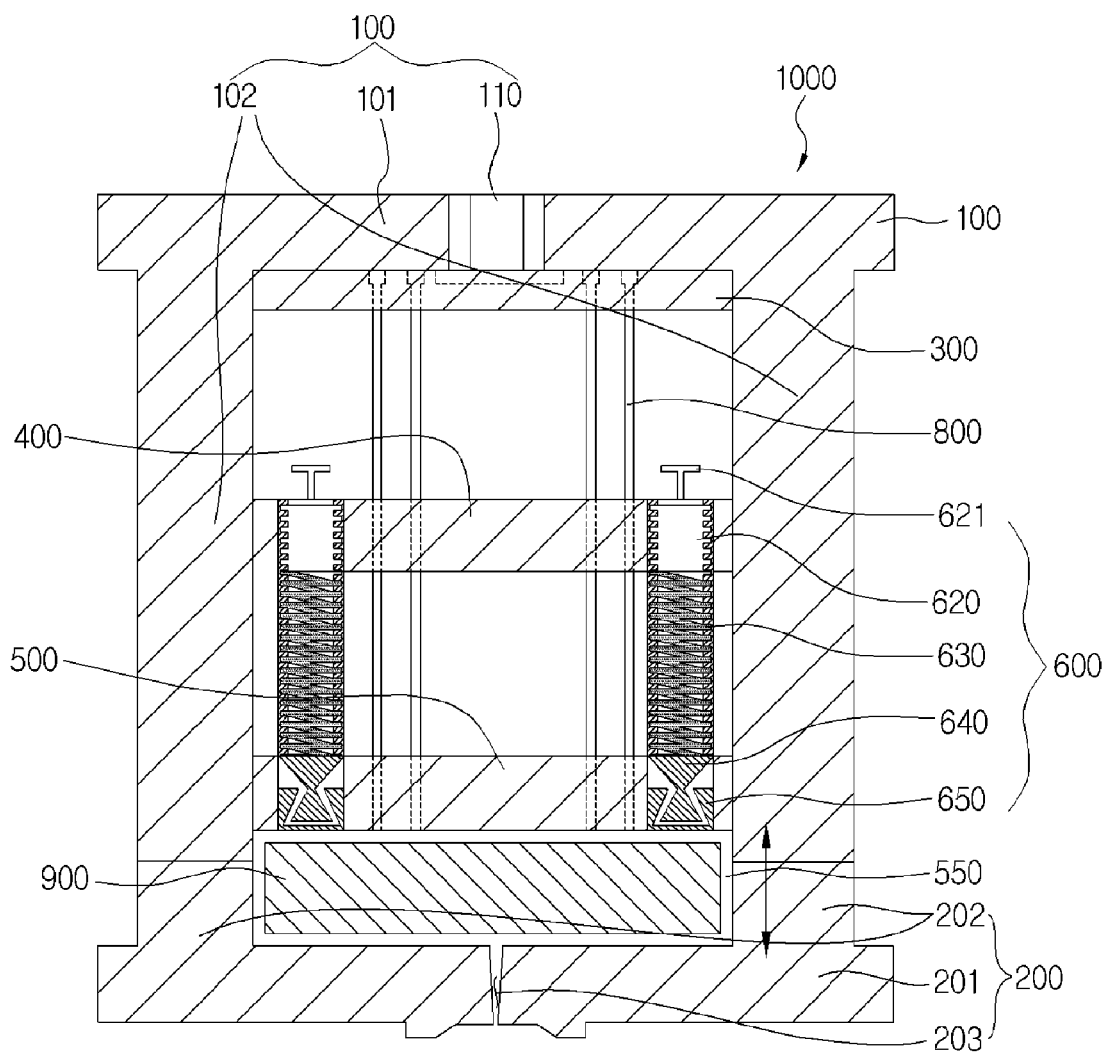
FIG. 4 is a cross-sectional view of an injection molding apparatus according to another exemplary embodiment of the present invention.
Figure 5:
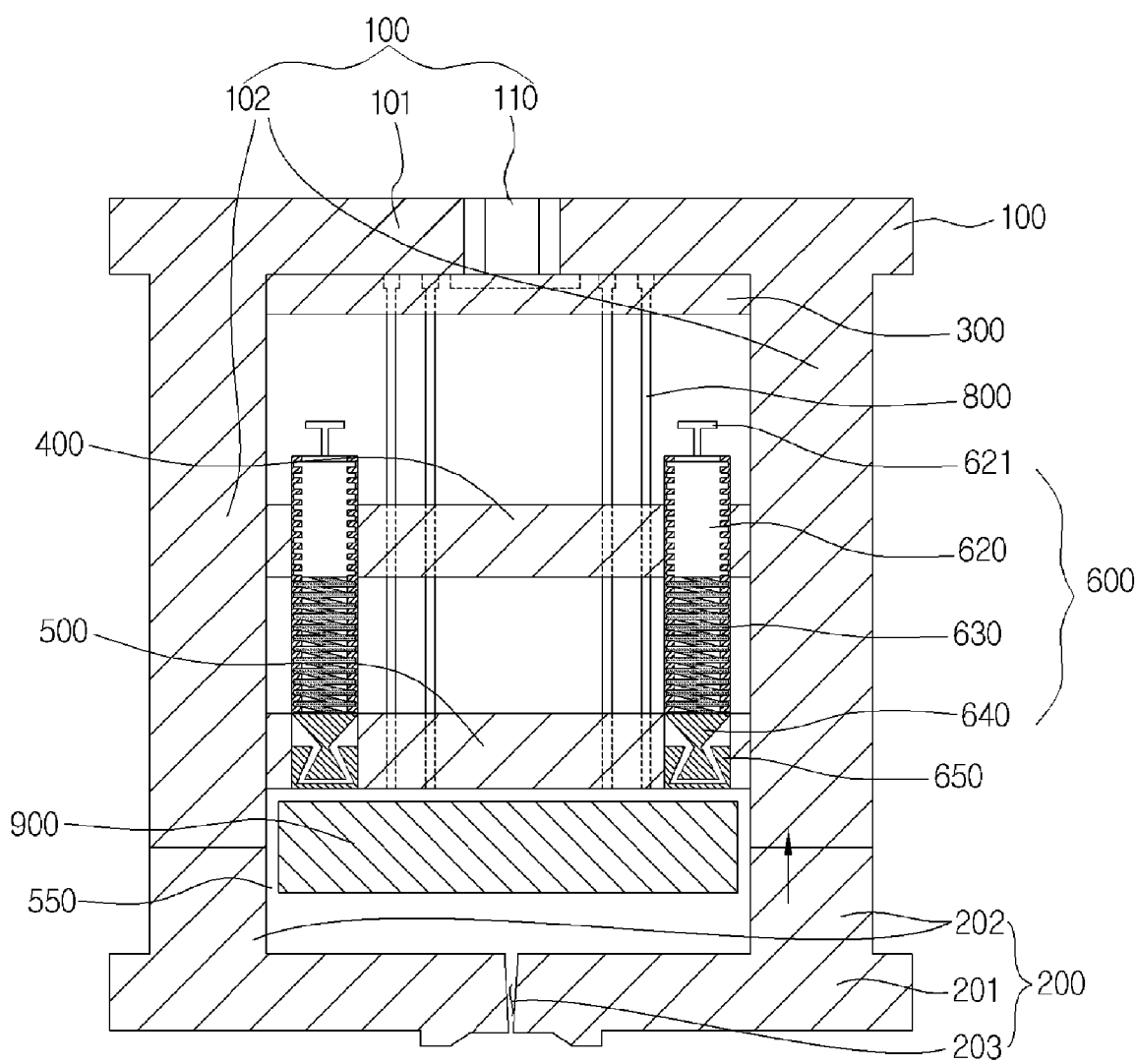
FIG. 5 is a cross-sectional view showing a state in which a movable block of the injection molding apparatus according to another exemplary embodiment of the present invention ascends.

FIG. 4 is a cross-sectional view of an injection molding apparatus according to another exemplary embodiment of the present invention; and FIG. 5 is a cross-sectional view showing a state in which a movable block of the injection molding apparatus according to another exemplary embodiment of the present invention ascends.

As shown in FIGS. 4 and 5, in the injection molding apparatus 1000 according to another exemplary embodiment of the present invention, the movable block adjusting unit 600 includes a screw 620, a screw handle 621, a second spring 630, a shaft part 640, and a suspending box 650.

The screw 620 is screwed to the fixed block 400 so that a lower portion thereof protrudes downwardly from the fixed block 400.

In addition, the screw 620 is formed to be long in the vertical direction.

The screw handle 621, which is a handle for manually turning the screw, has a lower end coupled to an upper end of the screw 620.

The second spring 630 is wound around a lower circumference of the screw 620 protruding downwardly of the fixed block 400.

The shaft part 640 is formed in a sandglass shape and has an upper end coupled to a lower end of the screw 620.

The suspending box 650 has a depressed upper surface, such that a lower portion of the shaft part 640 is rotatably inserted thereinto, and is insertedly coupled into an upper surface of the movable block 500.

In addition, the suspending box 650 has a structure in which widths of a left surface and a right surface thereof in the horizontal direction become gradually narrower toward a downward direction.

Therefore, when the screw 620 screwed to the fixed block 400 ascends, the movable block 500 suspended at a lower portion of the screw 620 by the shaft part 640 and the suspending box 650 also ascends.

In addition, when the screw 620 screwed to the fixed block 400 descends, the movable block 500 suspended at a lower portion of the screw 620 by the shaft part 640 and the suspending box 650 also descends.

Therefore, the ascent and the descent of the movable block 500 may be more precisely adjusted using the ascent and the descent of the screw 620.

Figure 6:
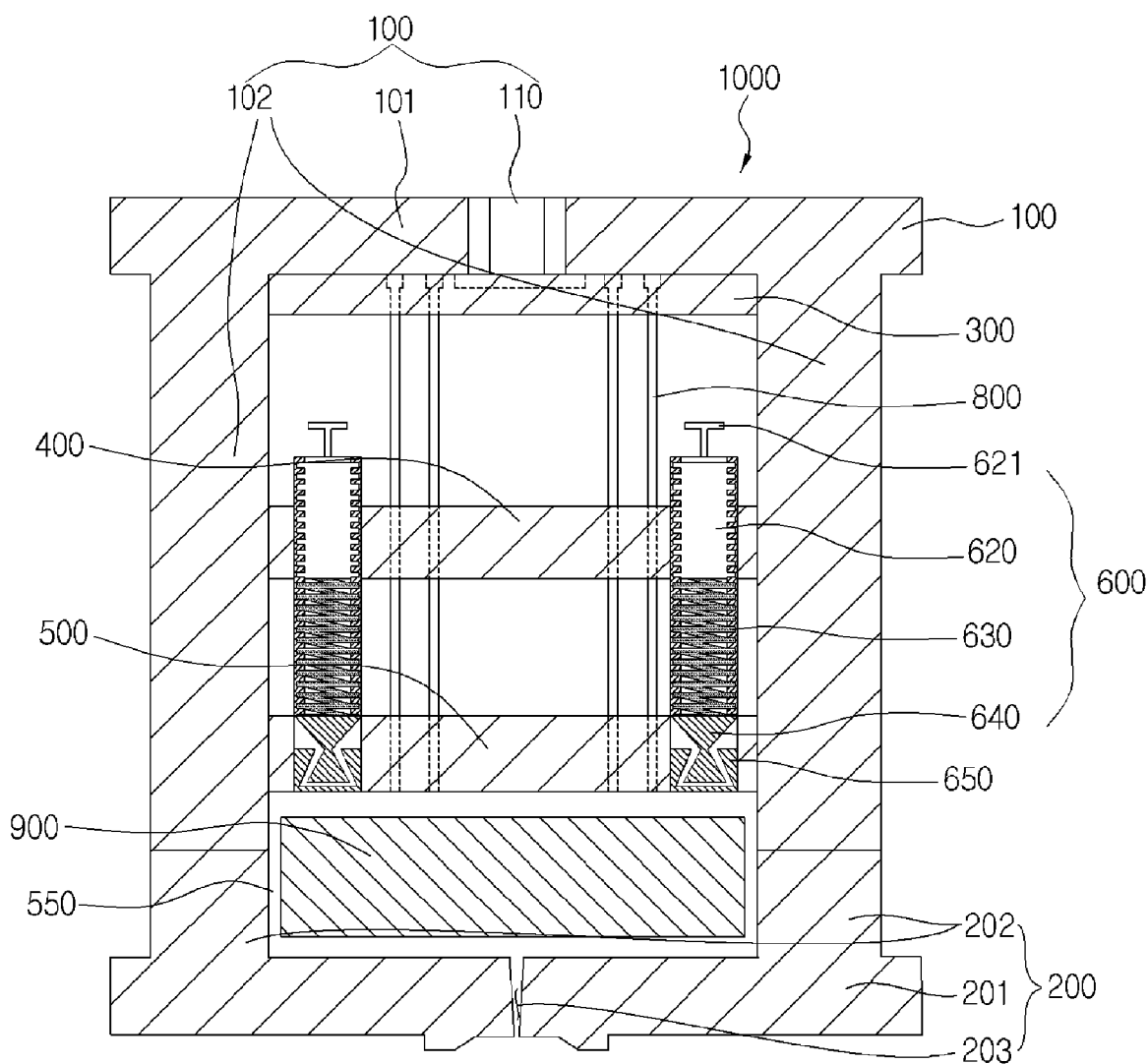
FIG. 6 is a cross-sectional view showing a state in which an internal mold of the injection molding apparatus according to another exemplary embodiment of the present invention is replaced.

FIG. 6 is a cross-sectional view showing a state in which an internal mold of the injection molding apparatus according to another exemplary embodiment of the present invention is replaced.

As shown in FIG. 6, even in the injection molding apparatus 1000 according to another exemplary embodiment of the present invention, the internal mold 900 received in the variable cavity 550 may be simply replaced.

FIGS. 7 to 11 are flow charts of an injection molding method using the injection molding apparatus according to another exemplary embodiment of the present invention.

The injection molding method using the injection molding apparatus according to another exemplary embodiment of the present invention will be described in detail with reference to FIGS. 7 to 11.

Figure 7:
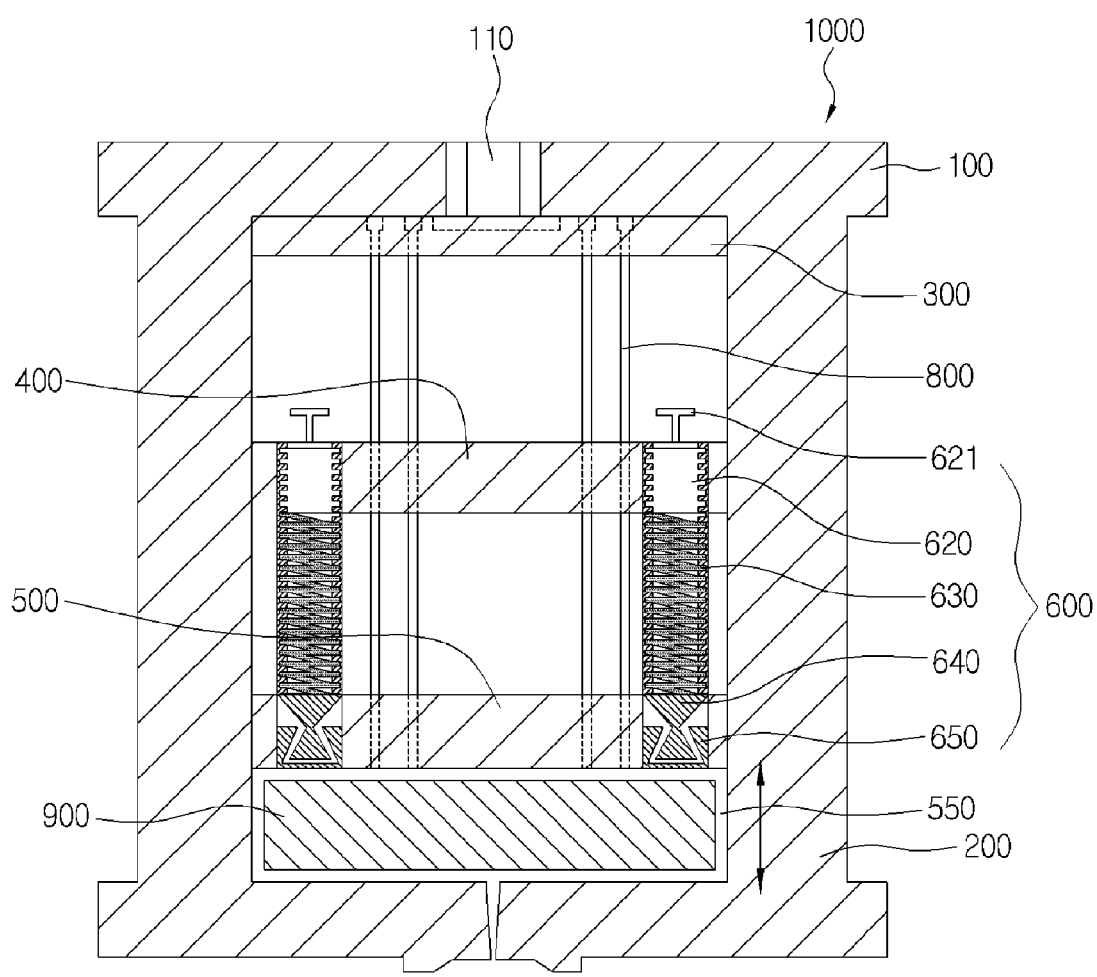
FIGS. 7 to 11 are flow charts of an injection molding method using the injection molding apparatus according to another exemplary embodiment of the present invention.

First, as shown in FIG. 7, the size of the variable cavity 550 is adjusted using the screw 620 which is the movable block adjusting unit 600, and the internal mold 900 is inserted into the variable cavity 550.

Figure 8:
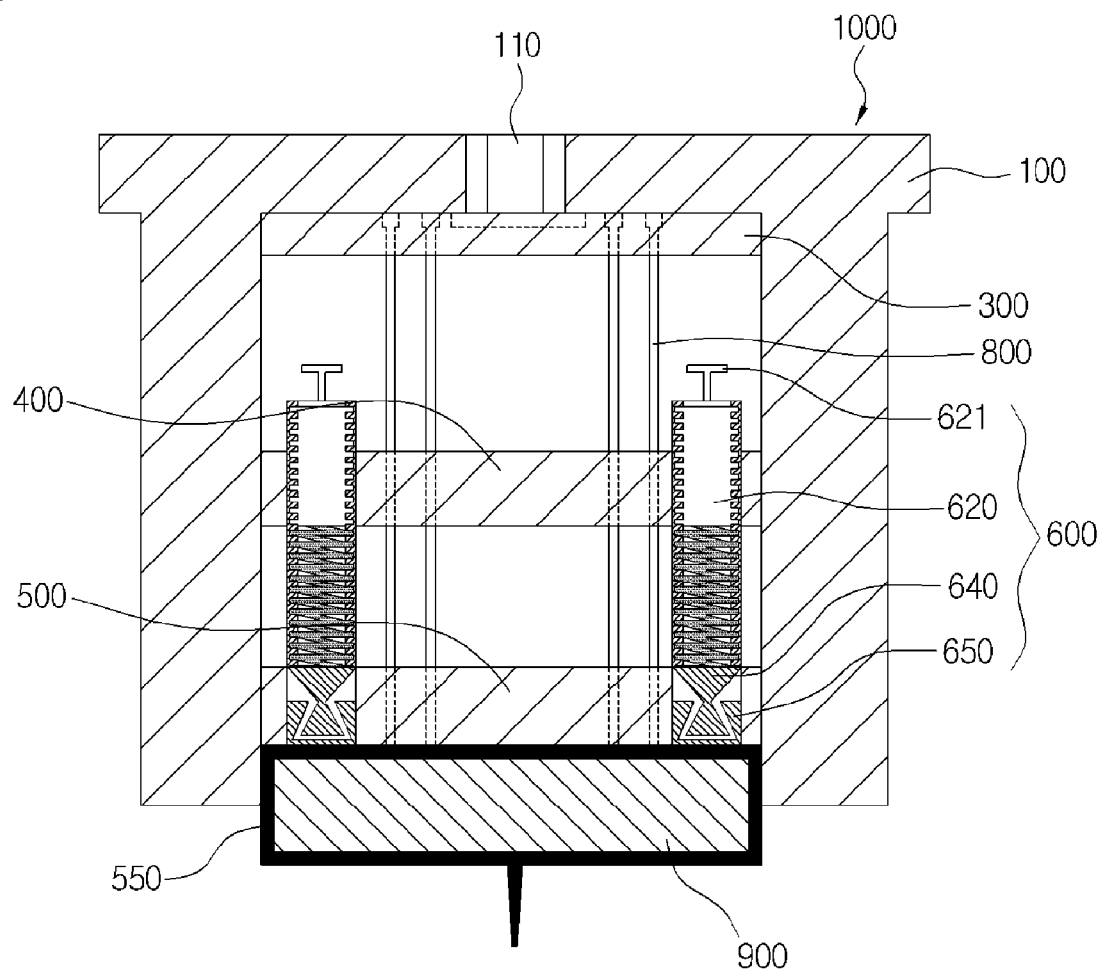
Figure 8:
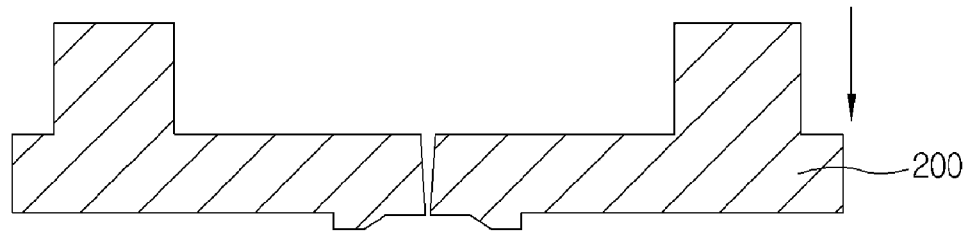

Then, as shown in FIG. 8, the melted resin is inserted into the variable cavity 550 through the injection hole, and the lower mold 200 and the upper mold 100 are separated from each other.

Figure 9:
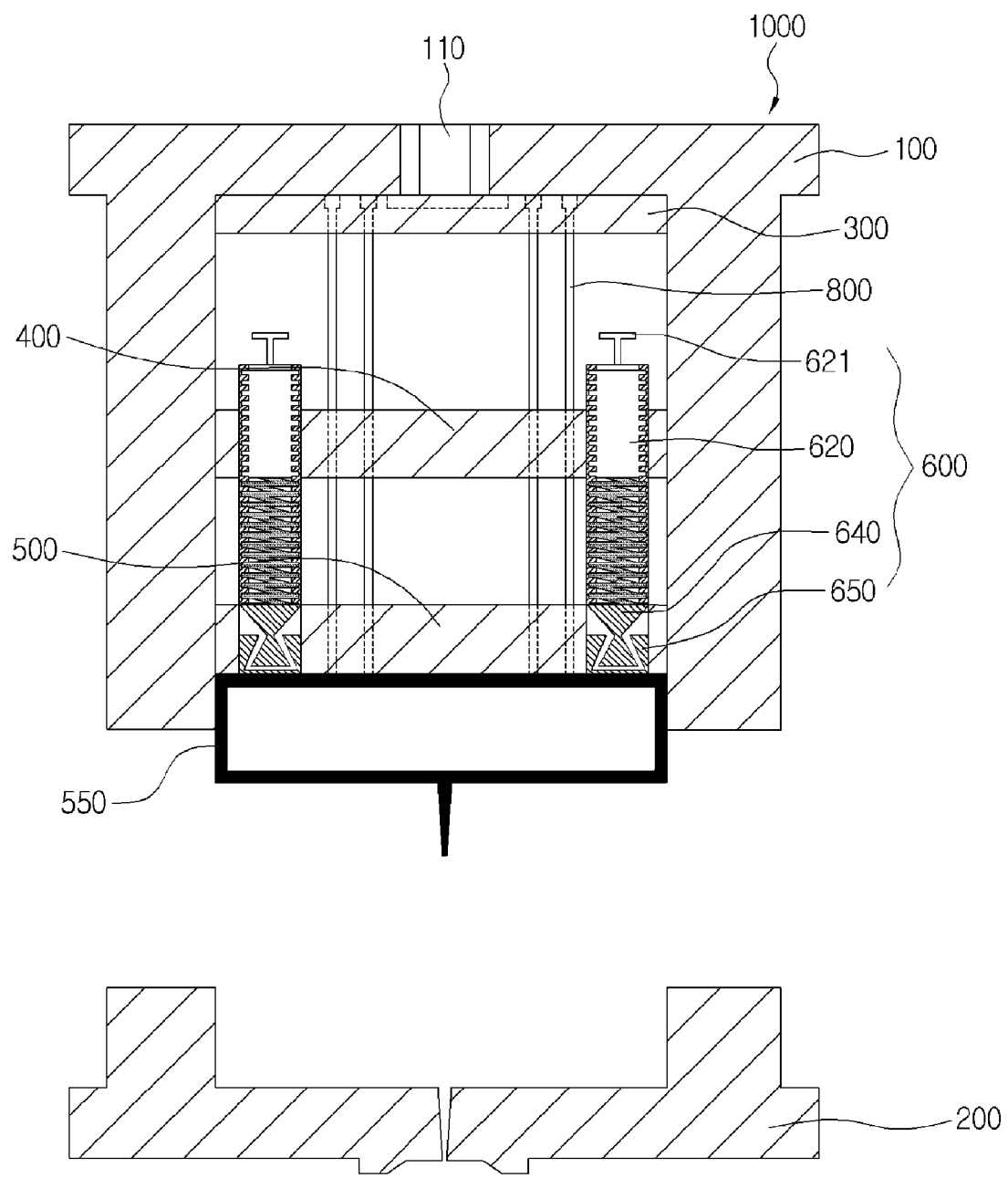

Next, as shown in FIG. 9, before the melted resin is solidified, the internal mold 900 inserted into the variable cavity 550 is removed.

Figure 10:
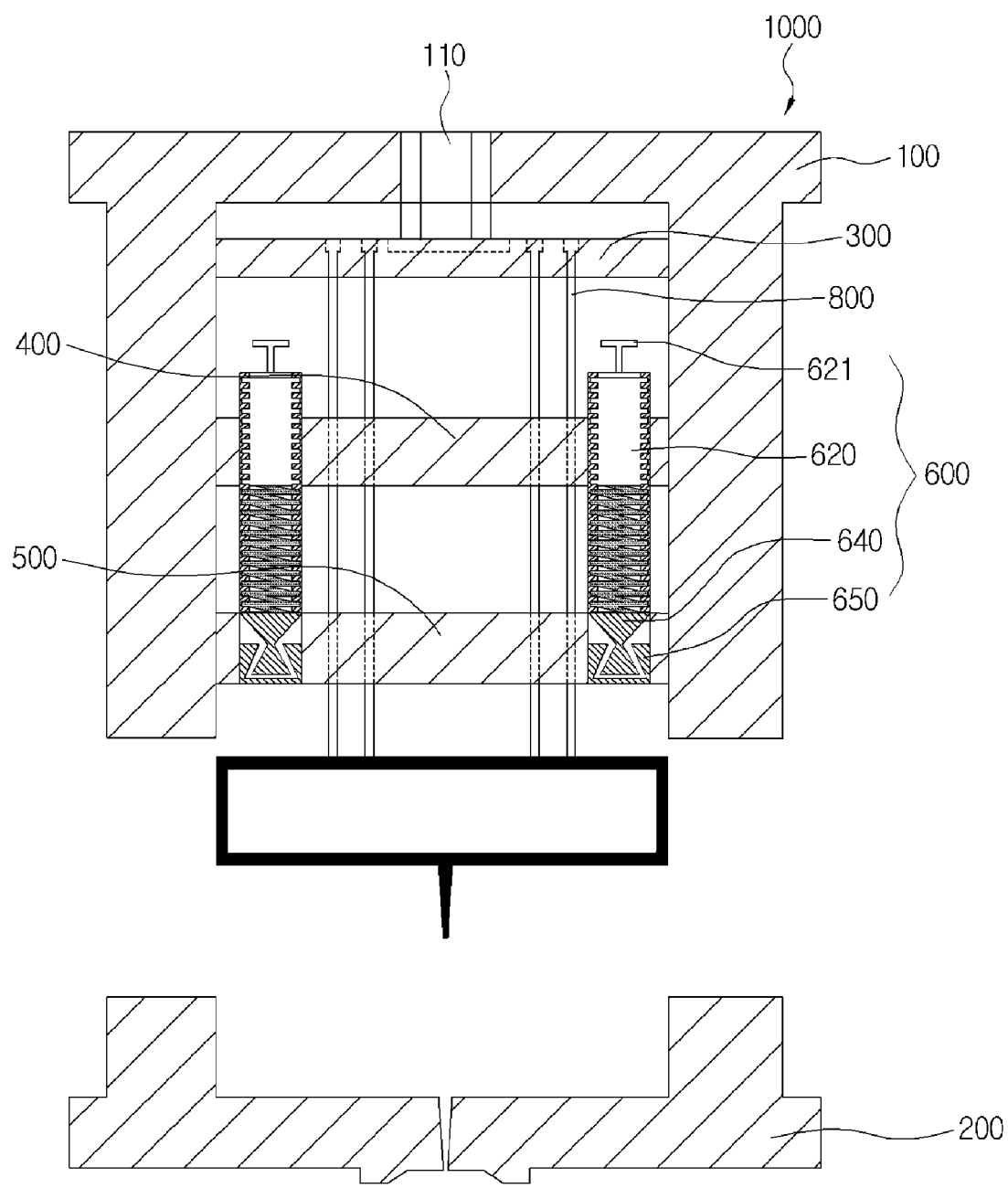

Thereafter, as shown in FIG. 10, the plurality of ejector pipes 800 descend using the cylinder 110 to eject the melted resin solidified in the variable cavity 550.

Figure 11:
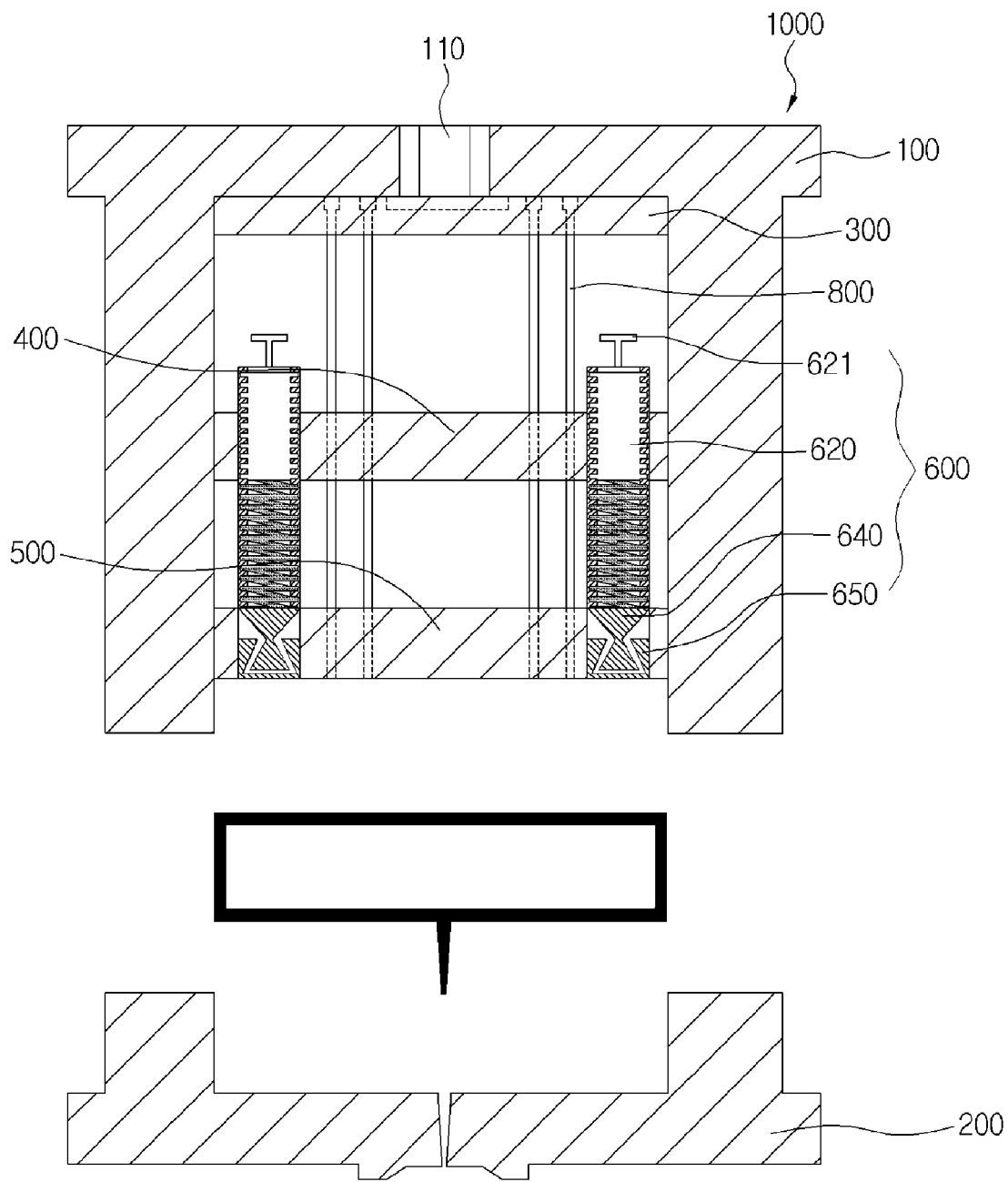

Then, as shown in FIG. 11, the plurality of ejector pipes 800 ascend using the cylinder 110 and the solidified melted resin is removed. Here, the solidified melted resin means a completed injection molding product.

The accompanying drawings are only examples shown in order to describe the technical idea of the present invention in more detail. Therefore, the technical idea of the present invention is not limited to shapes of the accompanying drawings.

The present invention is not limited to the above-mentioned exemplary embodiments, and may be variously applied, and may be variously modified without departing from the gist of the present invention claimed in the claims.

The invention claimed is:
1. An injection molding apparatus comprising;
an upper mold including a first plate, a first pair of plates arranged in a horizontal direction and each having an upper ends coupled to a lower surface of the first plate, and a cylinder penetrating through the first plate in a vertical direction so that a lower portion thereof protrudes downwardly of the first plate and ascending and descending;

a lower mold including a second plate spaced downwardly apart from the first plate by a predetermined distance, a second pair of plates arranged in the horizontal direction and each having a lower end coupled to an upper surface of the second plate and an upper end contacting a lower end of the first pair of plates, and an injection hole formed at a central portion of the second plate and having a melted resin injected therethrough;

a receive block disposed in parallel with the first plate and having a lower portion of the cylinder buried therein;

a fixed block interposed between the first pair of plates;

a movable block spaced downwardly apart from the fixed block by a predetermined interval, interposed between the first pair of plates or between the second pair of plates, and ascending and descending;

a variable cavity formed between the movable block and the upper and lower molds, filled with the melt resin injected from the injection hole, and having a size adjusted by the ascent and the descent of the movable block;

a movable block adjusting unit connecting the fixed block and the movable block to each other and adjusting the ascent and the descent of the movable block; and an ejector pipe having an upper portion buried in the receive block, penetrating through the fixed block and the movable block in the vertical direction, and ascending or descends by the cylinder and the receive block to eject the melted resin solidified in the variable cavity to the outside.

2. The injection molding apparatus of claim 1, further comprising an internal mold received in the variable cavity.

3. The injection molding apparatus of claim 2, wherein the internal mold is formed in a rectangular shape.

4. The injection molding apparatus of claim 1, wherein the movable block adjusting unit is a first spring connecting the fixed block and the movable block to each other.

5. The injection molding apparatus of claim 4, wherein the first spring has an upper portion buried in the fixed block and a lower portion buried in the movable block.

6. The injection molding apparatus of claim 1, wherein the movable block adjusting unit includes:

a screw screwed to the fixed block so that a lower portion thereof protrudes downwardly from the fixed block;

a screw handle coupled to an upper end of the screw;

a second spring wound around a lower circumference of the screw;

a shaft part formed in a sandglass shape and having an upper end coupled to a lower end of the screw; and a suspending box having a lower portion of the shaft part rotatably inserted thereinto, and insertedly coupled into the movable block.

7. The injection molding apparatus of claim 6, wherein the suspending box has a structure in which widths of a left surface and a right surface thereof in the horizontal direction become gradually narrower toward a downward direction.

* * * * *